United States Patent Office 3,135,791
Patented June 2, 1964

3,135,791
(DIALKYLAMINO)IMINO BISACETAMIDES
William F. Bruce, Havertown, and Joseph Tokolics, King of Prussia, Pa., assignors to American Home Products Corporation, New York, N.Y., a corporation of Delaware
No Drawing. Filed Feb. 26, 1962, Ser. No. 175,833
3 Claims. (Cl. 260—558)

The invention relates generally to amides, and more particularly to novel bisacetamides and salts thereof.

In USP 2,780,646 there are disclosed novel alkanol aminobisacetamides, their salts, and methods for producing them. As noted in the patent, the compounds disclosed and claimed therein show surprisingly good local anesthetic action. However, it is stated in the patent that the replacement in the class of compounds disclosed therein, of the hydroxy group with an amino radical, for example, was found to destroy the local anesthetic action and that other than in the cases of aliphatic, aromatic or heterocyclic or inorganic acid esters of said compounds, no prediction with regard to local anesthetic action is possible when other radicals replace the alkanol residue attached to the amino nitrogen atom.

It has now been discovered that certain other bisacetamides as defined hereinafter that do not contain an alkanol residue as described above also show good local anesthetic action. The new compounds, in the form of the free bases, may be represented by the formula:

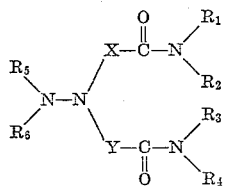

wherein $R_1$ and $R_3$ represent lower alkyl radicals, $R_2$ and $R_4$ represent aralkyl radicals, X and Y represent divalent alkylene radicals, and $R_5$ and $R_6$ represent lower alkyl radicals. The aralkyl radicals $R_2$ and $R_4$ may represent phenyl- or substituted phenyl-lower alkyl radicals wherein such substituents as lower alkyl-, lower alkoxy-, hydroxy-, halogen-, nitro-, amino-, mono- or di- lower alkyl-amino radicals may be on the ring. In the case of aralkyls of the beta-phenylethyl type, hydroxy substituents on the beta-carbon of the alkyl are also contemplated.

The local anesthetic action of the new compounds falling within the definition above was an unpredictable characteristic. Similarly, no prediction with regard to anesthetic action is possible where the radical to which the acetamide groups are attached is other than of the classes specified above. For example, the compounds (I) $NH_2.CH_2.CH_2N.[CH_2CON(CH_3)C(CH_3)_2.CH_2.C_6H_5]_2$ (II) $HO.(CH_2)_6.N.[CH_2CON(CH_3).C(CH_3)_2.CH_2.C_6H_5]_2$ were found to have no local anesthetic action.

Compounds falling within the scope of the formula as given above may be used in the form of acid-addition salts while still retaining their effectiveness for local anesthetic use. The salts provide great flexibility in therapeutic use since they may impart various degrees of water-solubility to an otherwise substantially insoluble base. With reference to the acid-addition salts, either organic or inorganic acids may be used as long as they do not substantially increase toxicity of the compound when the compound is to be used for its local anesthetic function. Thus, the hydrochloride, sulfate, phosphate, hydrobromide, acetate, tartrate, propionate or succinate are among the salts considered useful for the purposes indicated.

In preparing the novel bisacetamides of the invention, the free bases are prepared by reacting an appropriate amine which will furnish the desired di-lower-alkyl amino-imino residue (as defined above) in the final compound, with an alpha-halo-fatty acid amide containing the required lower alkyl and aralkyl substituents on the nitrogen atom as specified hereinbefore, in a molar ratio of 1:2. Preferably, the amide is present in slight excess of the ratio stated.

On the other hand, where the fatty acid amide residues in the final compounds are desired to be dissimilar, as, for example, where X and Y are to be different alkylene radicals or where $R_1$ is to differ from $R_3$, the bases may be prepared by initially reacting in a molar ratio of say about 1:1, the chosen amine that will supply the di-lower-alkyl amino-imino radical as defined herein with a halo-fatty acid amide that will supply the X and $R_1$ radicals desired. The resulting amino-fatty acid amide may then be reacted with another halo-fatty acid amide in say about 1:1 molar ratio, the latter amide being chosen so that it will supply the differing Y and $R_3$ radicals desired in the final bisacetamide. Alternately, appropriate mixtures of differing halo-fatty acid amides may be reacted simultaneously with the amine compound. The halogen atom in the halo-fatty acid amides used by be either chlorine or bromine. Generally, the bisacetamides of the invention are prepared as taught by the general procedure outlined in the patents to Bruce et al., 2,568,142, dated September 18, 1951, or 2,654,754, dated October 6, 1953, suitably modified, of course, to provide the proper amine and halogenated reactants.

The reaction of the amide and amine is carried out substantially under conditions as described in the above-mentioned U.S. Patent No. 2,780,646. Thus, the reaction temperature is in the range of about 80° to about 200° C. but is preferably in the narrower range of about 100° to about 180° C. Alcohols of 3 to 7 carbon atoms, anisole, dioxane, hydrocarbon solvents, such as xylene, or in fact, any inert solvent boiling within the ranges indicated are suitable, reaction taking place at the refluxing temperature of the solvent. Acid acceptors or mildly basic material are also provided for the reaction. These acceptors may be an alkali or alkaline earth metal oxide, carbonate or bicarbonate, pyridine, or like substances.

To prepare the acid-addition salts of the compounds discussed herein, the free base is generally dissolved in a suitable solvent and the selected acid is added thereto. Such preparation of acid-addition salts is well known and hence need not be described herein.

The following example illustrates the preparation of a typical compound falling within the scope of the invention:

EXAMPLE 1

Preparation of 2,2'-[(Dimethylamino)Imino]Bis[N-(a,a-Dimethylphenethyl) - N - Methylacetamide]Di-Hydrobromide

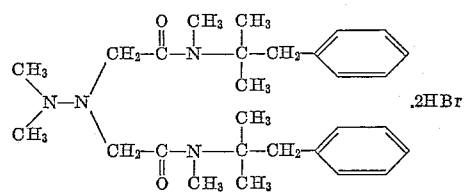

A mixture of 48 g. of 2-chloro-N-(a,a-dimethylphenethyl)-N-methylacetamide, 9.4 g. of N,N-dimethylhydrazine, 40 g. of powdered anhydrous potassium carbonate, and 250 ml. of n-butanol was refluxed for 20 hours. The reaction mixture was then cooled and filtered. The filtrate was washed with aqueous 5% sodium carbonate then with water, and dried over anhydrous magnesium sulfate. The solvent was completely removed under reduced pressure.

The free base was converted to the hydrobromide by dissolving the residue in ether and adding dry hydrogen bromide. Recrystallized from acetone-chloroform, it melted at 177–178° C.

Analysis.—Calcd. for $C_{28}H_{44}Br_2N_4O_2$: N, 8.91; Br, 25.43. Found: N, 8.68; Br, 24.65.

The product of Example 1 in the form of the designated acid-addition salt and several other compounds included for purposes of comparison were tested to determine their respective local anesthetic action. The method of testing for local anesthetic action comprised the simple procedure of placing .1 mg. of the compound of the tongue of a human and then noting subjectively the time it took for numbness to subside. To designate the degree of local anesthetic action of the compounds tested, an arbitrary scale was employed wherein ++ was used to designate anesthetizing characteristics which persisted for from 15–20 minutes. On this same scale + was used to indicate anesthetic action for from 5–10 minutes, and 0 for no such action at all. This scale is employed in the table below.

TABLE

| Compound tested: | Anesthetic action |
| --- | --- |
| 1. Acid-addition salt of Ex. 1 | ++ |
| 2. Acid-addition salt of compound (I) | 0 |
| 3. Acid-addition salt of compound (II) | 0 |
| 4. Cocaine hydrochloride | + |

It will be observed that compound 1 coming within the scope of the invention showed local anesthetic action of a highly desirable degree. The importance of such characteristics will be more readily recognized when it is noted that compound 1 was found to be 2 times as effective as the cocaine salt. On the other hand, the results with respect to compounds 2 and 3 clearly demonstrated the unpredictability of local anesthetic action upon variation of the amine residue from the definition thereof in accordance with the present invention.

EXAMPLE 2

*Preparation of 2,2'-(Diethylaminoimino)Bis[N-a,a-Dimethylphenethyl)-N-Methylacetamide]Di-Hydrobromide*

Following a procedure similar to that of Example 1, a mixture of 2-chloro-N-(a,a-dimethylphenethyl)-N-methylacetamide, N,N-di-ethylhydrazine, powdered anhydrous potassium carbonate, and n-butanol gives 2,2'-(diethylaminoimino)bis[N - (a,a-dimethylphenethyl) - N-methylacetamide]di-hydrobromide.

EXAMPLE 3

*Preparation of 2,2'-(Dimethylamino)Bis[N-a,a-Dimethylphenethyl)-N-Ethylacetamide]Di-Hydrobromide*

In a procedure similar to that in Example 1, a mixture of 2-chloro-N-(a,a-dimethylphenethyl)-N-ethylacetamide, N,N-dimethylhydrazine, anhydrous powdered potassium carbonate, and n-butanol gives 2,2'-(dimethylaminoimino)bis[N - (a,a-dimethylphenethyl) - N - methylacetamide]di-hydrobromide.

We claim:

1. A compound of the group consisting of aralkyl amides and the non-toxic acid-addition salts thereof, said amides having the formula

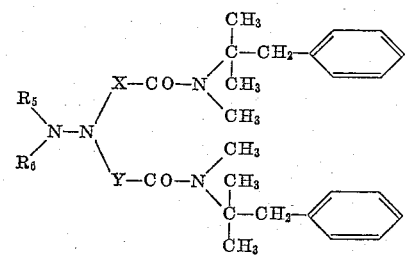

wherein $R_5$ and $R_6$ are lower alkyl and X and Y are divalent lower alkylene.

2. A compound of the group consisting of aralkyl amides and the non-toxic acid-addition salts thereof, said amides having the formula

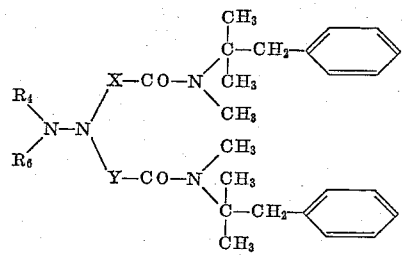

wherein $R_5$ and $R_6$ are alkyl of 1 to 2 carbon atoms and X and Y are divalent alkylene of 1 to 2 carbon atoms.

3. The compound, 2,2'[(dimethylamino)imino]bis[N-(a,a-dimethylphenethyl)-N-methylacetamide].

No references cited.